(12) United States Patent
Bakalos

(10) Patent No.: US 10,547,237 B1
(45) Date of Patent: Jan. 28, 2020

(54) POWER CONVERTER CONTROL APPARATUS AND METHOD FOR HIGH STABILITY AND POWER FACTOR IMPROVEMENT IN THE PRESENCE OF HIGH SOURCE IMPEDANCES

(71) Applicant: MKS Instruments, Inc., Andover, MA (US)

(72) Inventor: Pericles N. Bakalos, Maynard, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 16/261,900

(22) Filed: Jan. 30, 2019

(51) Int. Cl.
*H02M 1/42* (2007.01)

(52) U.S. Cl.
CPC ....... *H02M 1/4225* (2013.01); *H02M 1/4216* (2013.01)

(58) Field of Classification Search
CPC .................................. H02M 1/42–2001/4291
See application file for complete search history.

(56) References Cited

U.S. PATENT DOCUMENTS

| | | | |
|---|---|---|---|
| 4,890,217 A | 12/1989 | Conway | |
| 5,144,222 A | 9/1992 | Herbert | |
| 5,471,378 A | 11/1995 | King | |
| 5,491,624 A | 2/1996 | Levran et al. | |
| 5,530,396 A | 6/1996 | Vlatkovic et al. | |
| 6,043,633 A | 3/2000 | Lev et al. | |
| 6,365,868 B1 * | 4/2002 | Borowy | B23K 10/006 219/121.54 |
| 6,445,600 B2 | 9/2002 | Ben-Yaakov | |
| 6,728,121 B2 | 4/2004 | Ben-Yaakov et al. | |
| 6,731,524 B2 | 5/2004 | Elek et al. | |
| 6,809,941 B2 | 10/2004 | Elek et al. | |
| 6,853,167 B2 | 2/2005 | Elek et al. | |
| 7,002,265 B2 | 2/2006 | Potega | |
| 7,358,706 B2 | 4/2008 | Lys | |
| 7,368,831 B1 | 5/2008 | Boeckmann | |
| 7,459,864 B2 | 12/2008 | Lys | |
| 7,706,151 B2 | 4/2010 | Neidorff et al. | |
| 7,893,678 B2 | 2/2011 | Blanken | |
| 8,536,848 B2 | 9/2013 | Zilberberg | |
| 8,659,278 B2 | 2/2014 | Arora et al. | |

(Continued)

*Primary Examiner* — Gary L Laxton
*Assistant Examiner* — Peter M Novak
(74) *Attorney, Agent, or Firm* — Burns & Levinson, LLP; Joseph M. Maraia; Steven M. Mills

(57) ABSTRACT

A power conversion system includes a feedback controller circuit connected between the output of a boost converter and a duty cycle control input of the boost converter. The feedback controller circuit comprises: a first summing node which generates an error signal indicative of a difference between a voltage of the output of the boost converter and a reference voltage, a compensator circuit receiving the error signal and applying a gain to the error signal to generate an amplified error signal, and a scaling circuit for scaling the amplified error signal to generate a scaled signal, which is applied to a duty cycle control input of the boost converter to alter the duty cycle and/or pulse frequency of the boost converter. The feedback controller circuit provides a frequency-dependent impedance transformation looking into the boost converter from the source such that instability due to line impedance is reduced.

6 Claims, 16 Drawing Sheets

(56) References Cited

U.S. PATENT DOCUMENTS

| | | |
|---|---|---|
| 8,830,702 B2 | 9/2014 | Macfarlane |
| 8,866,459 B2 | 10/2014 | Zilberberg |
| 9,313,564 B2 | 4/2016 | Efendowicz et al. |
| 9,502,981 B2 | 11/2016 | Schaemann et al. |
| 9,819,283 B2 | 11/2017 | Mahdavikhah et al. |
| 9,843,271 B1 | 12/2017 | Nikitin |
| 9,985,515 B1 | 5/2018 | Nikitin |
| 2005/0117374 A1 | 6/2005 | Sheehy et al. |
| 2006/0245219 A1* | 11/2006 | Li .................. G05F 1/565 363/89 |
| 2008/0316779 A1* | 12/2008 | Jayaraman .......... H02M 1/4225 363/74 |
| 2010/0118573 A1* | 5/2010 | Saint-Pierre ........ H02M 1/4225 363/126 |
| 2016/0121741 A1* | 5/2016 | Kim .................. B60L 11/1814 318/139 |

\* cited by examiner

POWER CONVERTER CONTROL APPARATUS AND METHOD FOR HIGH STABILITY AND POWER FACTOR IMPROVEMENT IN THE PRESENCE OF HIGH SOURCE IMPEDANCES

BACKGROUND

1. Technical Field

The present disclosure is related to power converters and, more particularly, to power converters with high stability and power factor improvement in the presence of high source impedances.

2. Discussion of Related Art

Power converters connected to high-power AC systems can often result in power line oscillations in the presence of moderate source impedances, requiring high-power equipment relying on power converters to incorporate some form of protection and mitigation. Under ordinary operating conditions, when a power converter is connected through a non-trivial source impedance, the effect is a high total harmonic distortion (THD) environment for the equipment and potentially the onset of line voltage oscillations, which can be destructive. This is most prevalent when operating on stepdown transformers, which have leakage inductances that can be on the order of 250 uH or higher. The prior art solutions to problems of this type typically require either a reduction of source impedance, some form of energy storage before the power converter, or passive damping. All of these solutions have high costs, and in general have large footprints that are commensurate with operation at the line frequency.

SUMMARY

According to one aspect, a power conversion system is provided. The system includes an input for receiving three-phase alternating current (AC) power signals on input power lines, each of the input power lines being characterized by a line impedance; a three-phase rectifier for rectifying the input power signals to generate rectified signals; and a filter circuit for filtering the rectified signals to generate filtered signals. A boost converter receives the filtered signals at a signal input of the boost converter, and converts the filtered signals to direct current (DC) signals and outputs the DC signals as output signals at an output of the boost converter. A feedback controller circuit is connected between the output of the boost converter and a duty cycle control input of the boost converter, the control input of the boost converter controlling duty cycle and pulse frequency of the boost converter. The feedback controller circuit comprises: a first summing node which generates an error signal indicative of a difference between a voltage of the output signal of the boost converter and a reference voltage, a compensator circuit receiving the error signal and applying a gain to the error signal to generate an amplified error signal, and a scaling circuit for applying a scale factor to the amplified error signal to generate a scaled signal, the scaled signal being applied to the duty cycle control input of the boost converter to alter the duty cycle and/or pulse frequency of the boost converter. The gain of the compensator circuit is dependent on the frequency of the boost converter such that the feedback controller circuit provides a frequency-dependent impedance transformation looking into the boost converter from the source such that instability due to the line impedance is reduced.

In some exemplary embodiments, the power conversion system further comprises an inverter receiving the output signal from the boost converter and converting the output signal from the boost converter to an AC signal. In some exemplary embodiments, the power conversion system further comprises a transformer receiving the AC signal at a primary winding of the transformer. In some exemplary embodiments, a secondary winding of the transformer is connected to a load. The load can be a plasma.

According to another aspect, a power conversion system is provided. The system includes an input for receiving three-phase alternating current (AC) power signals on input power lines, each of the input power lines being characterized by a line impedance; a three-phase rectifier for rectifying the input power signals to generate rectified signals; and a filter circuit for filtering the rectified signals to generate filtered signals. A boost converter receives the filtered signals at a signal input of the boost converter, the boost converter converting the filtered signals to direct current (DC) signals and outputting the DC signals as output signals at an output of the boost converter. A feedback control loop comprising a feedback controller circuit is connected between the output of the boost converter and a duty cycle control input of the boost converter, the control input of the boost converter controlling duty cycle and pulse frequency of the boost converter. The feedback controller circuit comprises: a first summing node which generates an error signal indicative of a difference between a scaled voltage of the output signal of the boost converter and a reference voltage, and a compensator circuit receiving the error signal and applying a gain to the error signal to generate an amplified error signal. The gain of the compensator circuit is dependent on the frequency of the boost converter such that the feedback controller circuit provides a frequency-dependent impedance transformation looking into the boost converter from the source such that instability due to the line impedance is reduced. A feedforward control loop is connected between the signal input of the boost converter and the duty cycle control input of the boost converter, the feedforward control loop being used to control power factor correction with respect to the three-phase alternating current (AC) power signals received on the input power lines.

In some exemplary embodiments, the power conversion system further comprises an inverter receiving the output signal from the boost converter and converting the output signal from the boost converter to an AC signal. In some exemplary embodiments, the power conversion system further comprises a transformer receiving the AC signal at a primary winding of the transformer. In some exemplary embodiments, a secondary winding of the transformer is connected to a load. The load can be a plasma.

In some exemplary embodiments, the feedforward control loop comprises a first scaling circuit for applying a scale factor to a sensed voltage of the filtered signals at the signal input of the boost converter to generate a scaled sensed voltage signal; and a second scaling circuit for applying a second scale factor to a sensed current of the filtered signals at the signal input of the boost converter to generate a first scaled sensed current signal. In some exemplary embodiments, the power conversion system further comprises a second summing node receiving the scaled sensed voltage signal and the amplified error signal and generating a first difference signal indicative of a difference between the scaled sensed voltage signal and the amplified error signal. In some exemplary embodiments, the power conversion system further comprises a third summing node receiving the first difference signal and the first scaled sensed current signal and generating a second difference signal indicative of a difference between the first difference signal and the first scaled sensed current signal. In some exemplary embodiments, the power conversion system further comprises a third scaling circuit for applying a scale factor to the second difference signal to generate a scaled second difference signal, the scaled second difference signal being applied to the duty cycle control input of the boost converter to alter the duty cycle and/or pulse frequency of the boost converter.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Alternating current (AC) utility power quality is variable and often poorly regulated in many settings. For example, semiconductor fabrication installations across the globe experience variations in power quality in the form of, for example, voltage fluctuations/differences, high source impedance, transformer leakage inductance, and other phenomena. Often, manufacturers use transformers for 208 3-phase AC y-delta conversion and/or step down from 480 VAC 3-phase utilities. Depending on the design quality, these transformers can and do exhibit a high leakage inductance. The issue with high leakage inductance is that the source impedance (and power loss) increases. This source impedance is inductive, which means it increases with frequency. The inductive source impedance can and does resonate with input filter capacitance on the output of a 3-phase rectifier, resulting in a high peak source impedance at resonance and a 180-degree phase lag at resonance. The source impedance creates a voltage divider at the input to any power converter. Another issue associated with this source impedance resonance is that it can and does result in power source instability and oscillations at the input to the converter (which worsen as load power is increases) due to the interaction of the power converter input impedance and the source impedance. A prior approach to handling this instability is to implement a damping circuit at the input to the converter. This damping circuit adds power loss, lowering the Q of the resonant system by dissipating power in the resistor of the damping RC network.

High AC utility source impedance/line inductance results in power converter system oscillations/instability. In typical conventional systems, this is mitigated by reactive damping circuits such as resistor-capacitor (RC) damping circuits, or other passive electrical schemes to damp out the instability/oscillation. These passive damping schemes typically involve the use of very bulky, expensive high-power devices such as, for example, large high-voltage electrolytic capacitors, large high-voltage power resistors, and other such devices.

Figure 1:
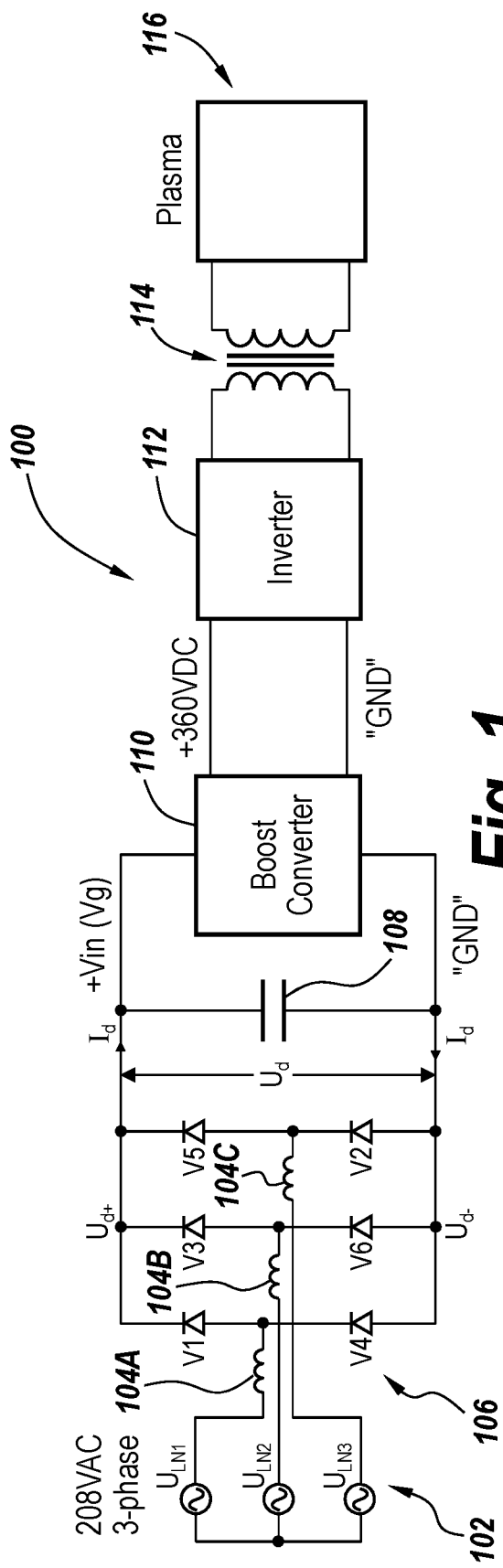
FIG. 1 includes a schematic functional block diagram of a plasma generation power converter system.

FIG. 1 includes a schematic functional block diagram of a plasma generation power converter system 100. Referring to FIG. 1, 208 VAC 3-phase line power 102 is received by system 100. Each line of the input power is characterized by a line inductance 104A, 104B, 104C. The input AC power 102 is rectified by 3-phase rectifier 106 and filtered by input filter capacitance 108. The rectified and filtered input power is applied to boost converter circuity 110, which generates and outputs direct current (DC) power output, which is illustrated in the exemplary embodiment to be nominally 360 VDC. The DC voltage is then applied to an inverter circuit 112, which converts the DC voltage to AC voltage, which is applied to an input winding of a transformer 114. An output winding of transformer 114 is applied to ignite and maintain generation of a plasma 116. In some exemplary embodiments, the plasma gas itself constitutes the output winding of transformer 114.

Figure 2:
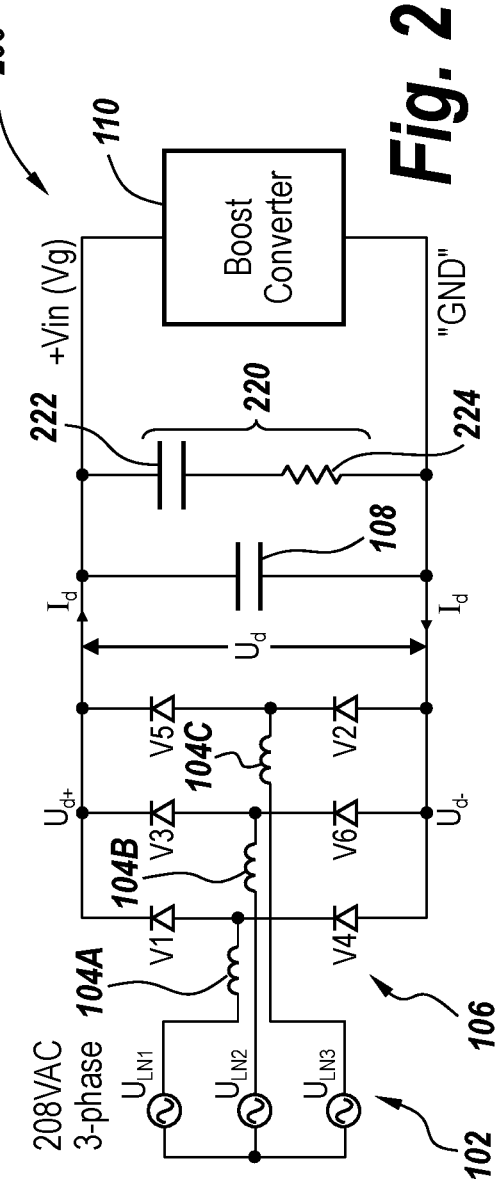
FIG. 2 includes a schematic functional block diagram of a portion of a plasma generation power converter system in which a passive damping circuit has been added to mitigate the instability effects of the system of FIG. 1.

In system 100 line inductance 104A, 104B, 104C resonates with filter capacitance 108, resulting in the instability referred to above. As noted above, a conventional solution to this issue is the addition of a passive damping circuit to system 100. FIG. 2 includes a schematic functional block diagram of a portion of a plasma generation power converter system 200 in which passive damping circuit 220 has been added to mitigate the instability effects of system 100 of FIG. 1. Referring to FIG. 2, like elements of FIG. 1 are identified by like reference numerals, and description of these like elements will not be repeated. Also, FIG. 2 illustrates only the portion of system 200 in front of boost converter 110. The remaining elements of FIG. 1, i.e., inverter 112, transformer 114 and plasma 116 are present, but illustration of these like elements is omitted in the interest of brevity and clarity of the description. Referring to FIG. 2, damping circuit 220 is placed at the input to boost converter 110 and can include, for example, a capacitance 222 in series with a resistance 224, the element values being selected to dampen oscillation due to source input impedance and improve stability of system 200. Capacitor 222 is used to prevent DC power dissipation in the damping resistor 224. However, as noted above, capacitance 222 typically includes one or more bulky, expensive high-voltage electrolytic capacitors, and resistance 224 typically includes one or more bulky, expensive high-voltage power resistors.

Figure 3:
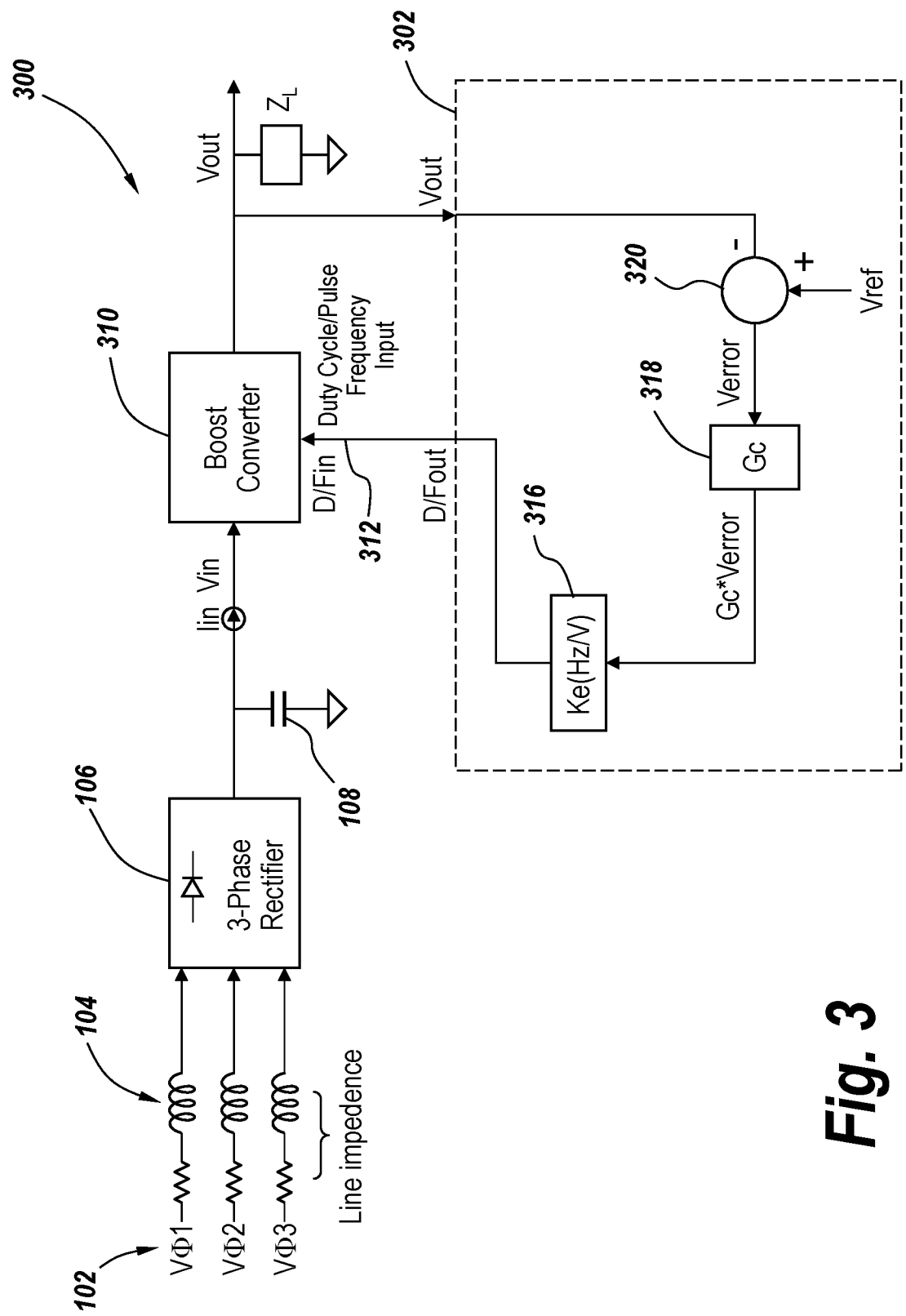
FIG. 3 includes a schematic functional block diagram of a power converter system which uses an active feedback loop controller to mitigate instability, according to some exemplary embodiments.

According to the present disclosure, the instability of systems 100 and 200 is mitigated without the use of the bulky and costly damping circuits of the prior art. FIG. 3 includes a schematic functional block diagram of a power converter system 300 which uses an active feedback loop controller 302 to mitigate instability, according to some exemplary embodiments. Referring to FIG. 3, system 300 receives 3-phase line power 102. Each line of the input power 102 is characterized by a line impedance 104. The input AC power 102 is rectified by 3-phase rectifier 106 and filtered by input filter capacitance 108. The rectified and filtered input power is applied to boost converter circuity 310, which generates and outputs direct current (DC) power output Vout, which is illustrated in the exemplary embodiment to be applied to a load $Z_L$ generally of complex impedance, which can be inverter circuit 112, transformer 114 and plasma 116 described and illustrated above.

Controller 302 includes a summing node 320, which sums the loop output voltage signal Vout at its inverting input with a reference voltage Vref at its noninverting input to generate an error signal Verror. The error signal is applied to an error amplifier/compensator Gc 318 which amplifies the error signal Verror to generate the output signal Gc*Verror. The amplified error signal Gc*Verror is applied to a scale factor generator 316, which generates a control signal which identifies a translation between error voltage and switching frequency of the boost converter. The scale factor Ke can be generated in Hertz/Volt. This scale factor D/Fout is output by controller 302 and applied as signal D/Fin at the Duty Cycle/Pulse Frequency input of boost converter 310 to control the frequency/duty cycle of the switching signal in boost converter 310 based on the amplified error signal Gc*Verror.

According to the present disclosure, feedback loop compensator Gc 318 is designed to make the system stable without the addition of RC damping circuitry or an active/passive power factor correction and oscillation damping front end. The frequency response of error amplifier/compensator Gc 318 results in a frequency dependent impedance transformation looking into boost converter 310 from the power source. Selection of this frequency dependent impedance transformation results in elimination of instability over the frequency range of interest. That is, by selection of the frequency response of error amplifier/compensator Gc 318, frequency shaping of the loop gain is achieved such that instability is eliminated over the desired frequency range. In effect, the loop gain is used to damp out the resonance to eliminate instability.

Figure 4:
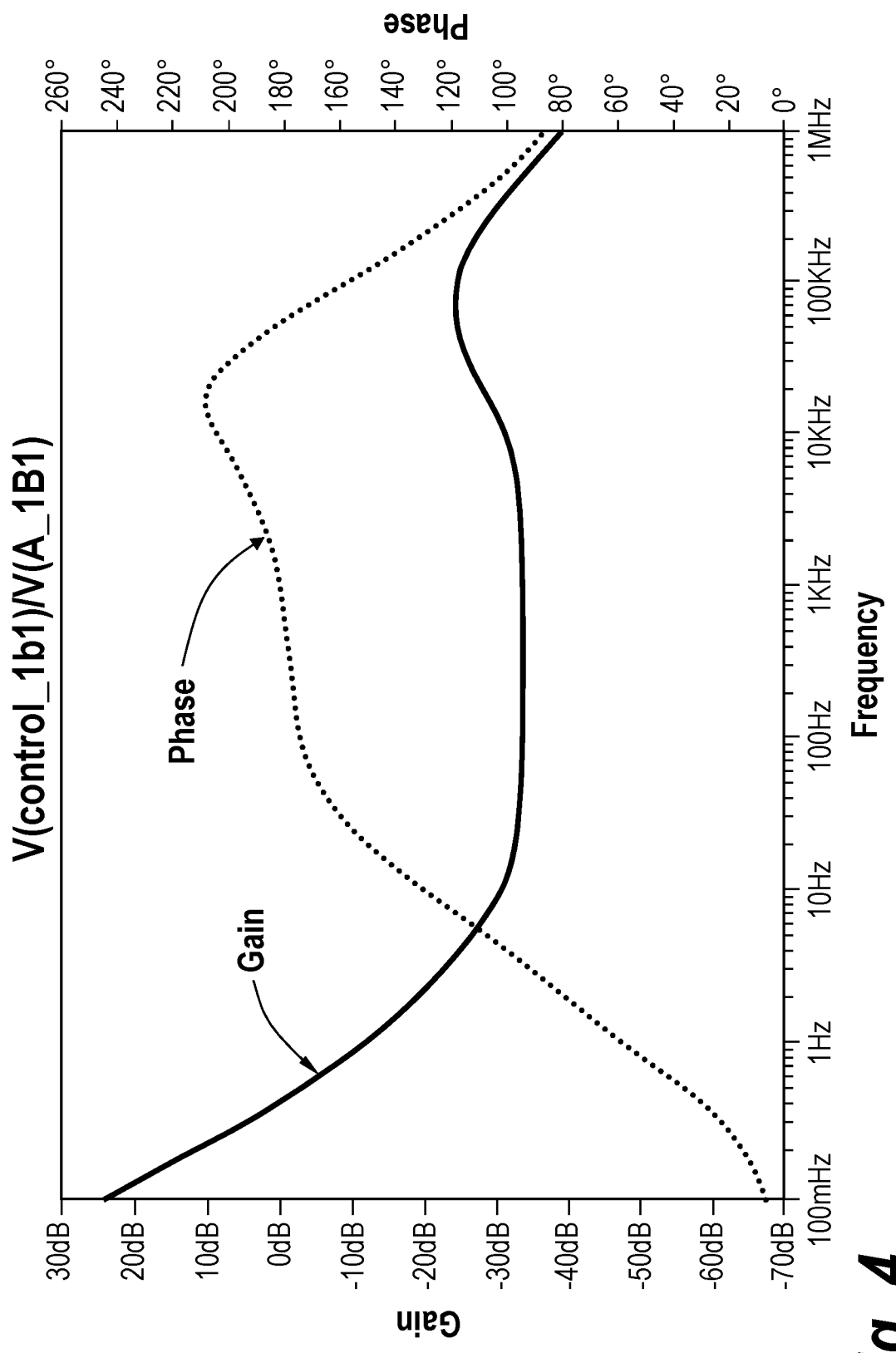
FIG. 4 includes a simulated transfer function plot illustrating operation of voltage feedback error to duty cycle/frequency for the system of FIG. 3, according to some exemplary embodiments.

FIG. 4 includes a simulated transfer function plot illustrating operation of voltage feedback error to duty cycle/frequency for the system of FIG. 3, according to some exemplary embodiments. Specifically FIG. 4 is a plot of the duty cycle output signal D/Fout with respect to voltage error amplifier input Vout. The plot shows how the duty cycle/frequency control signal responds in the frequency domain. For example, as illustrated, at low frequencies, the gain is high. At mid-band frequencies where the LC resonance due to line inductance 104 and input capacitance 108 occurs, the gain is low. The gain-versus-frequency response of this transfer function show the sensitivity of voltage feedback from Vout to D/Fout over frequency. This portion of the system response is insensitive to line inductance; therefore, no variation is seen in the curves here.

Figure 5:
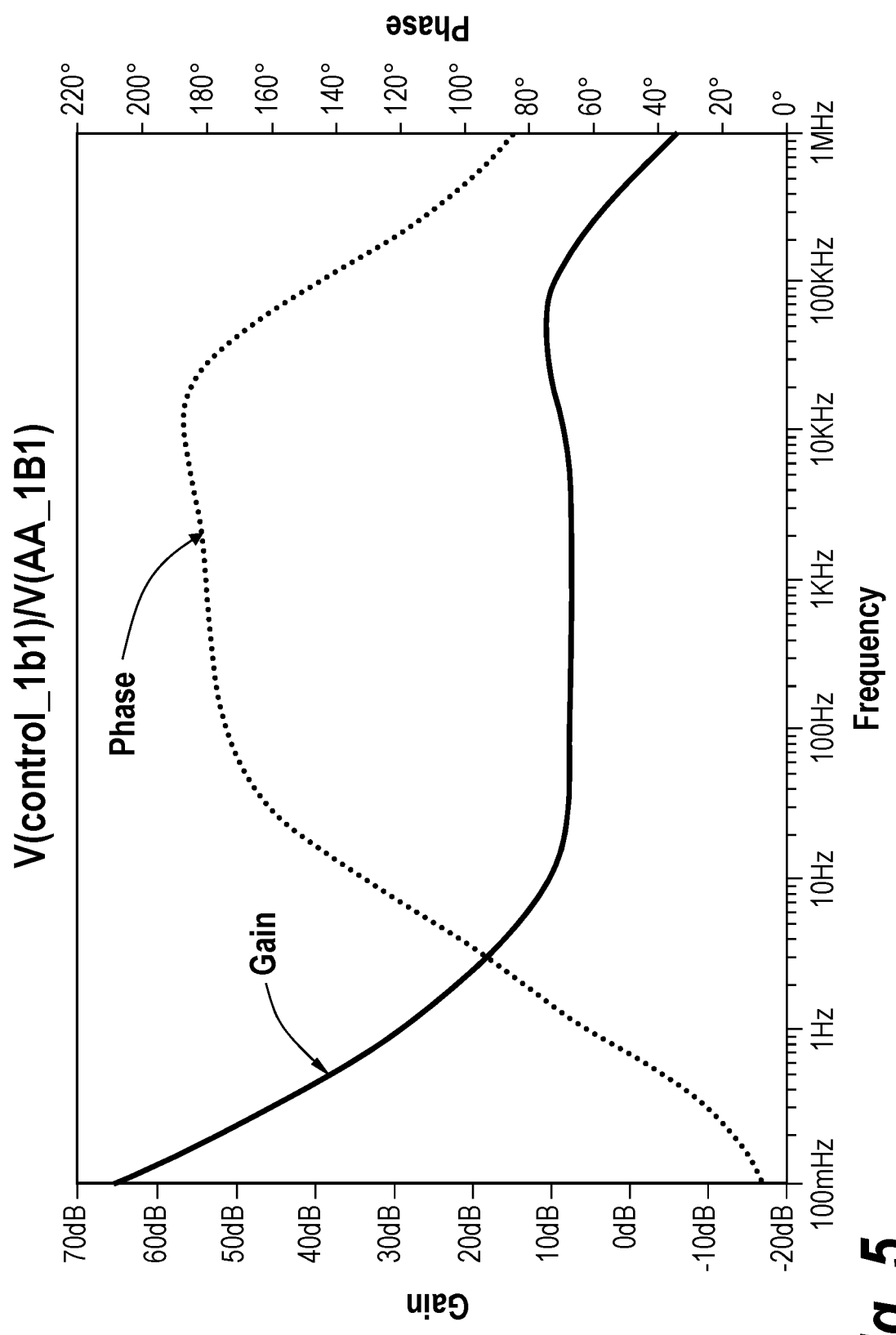
FIG. 5 includes a simulated transfer function plot illustrating operation of the error amplifier/compensator Gc for the system of FIG. 3, according to some exemplary embodiments.

FIG. 5 includes a simulated transfer function plot illustrating operation of error amplifier/compensator Gc 418 for the system of FIG. 3, according to some exemplary embodiments. Specifically FIG. 5 is a plot of the voltage error amplifier output signal Gc*Verror with respect to voltage error amplifier input Vout. The plot shows the Gc controller gain versus frequency, including the effect of the Ke(Hz/Volt) scale factor 316. The plot illustrates that the gain is highest at low frequencies and is shaped to minimize the sensitivity in the mid-band frequencies in the range of 100 Hz to 2 kH, where the input LC resonance occurs. This portion of the system response is insensitive to line inductance; therefore, no variation is seen in the curves here.

Figure 6:
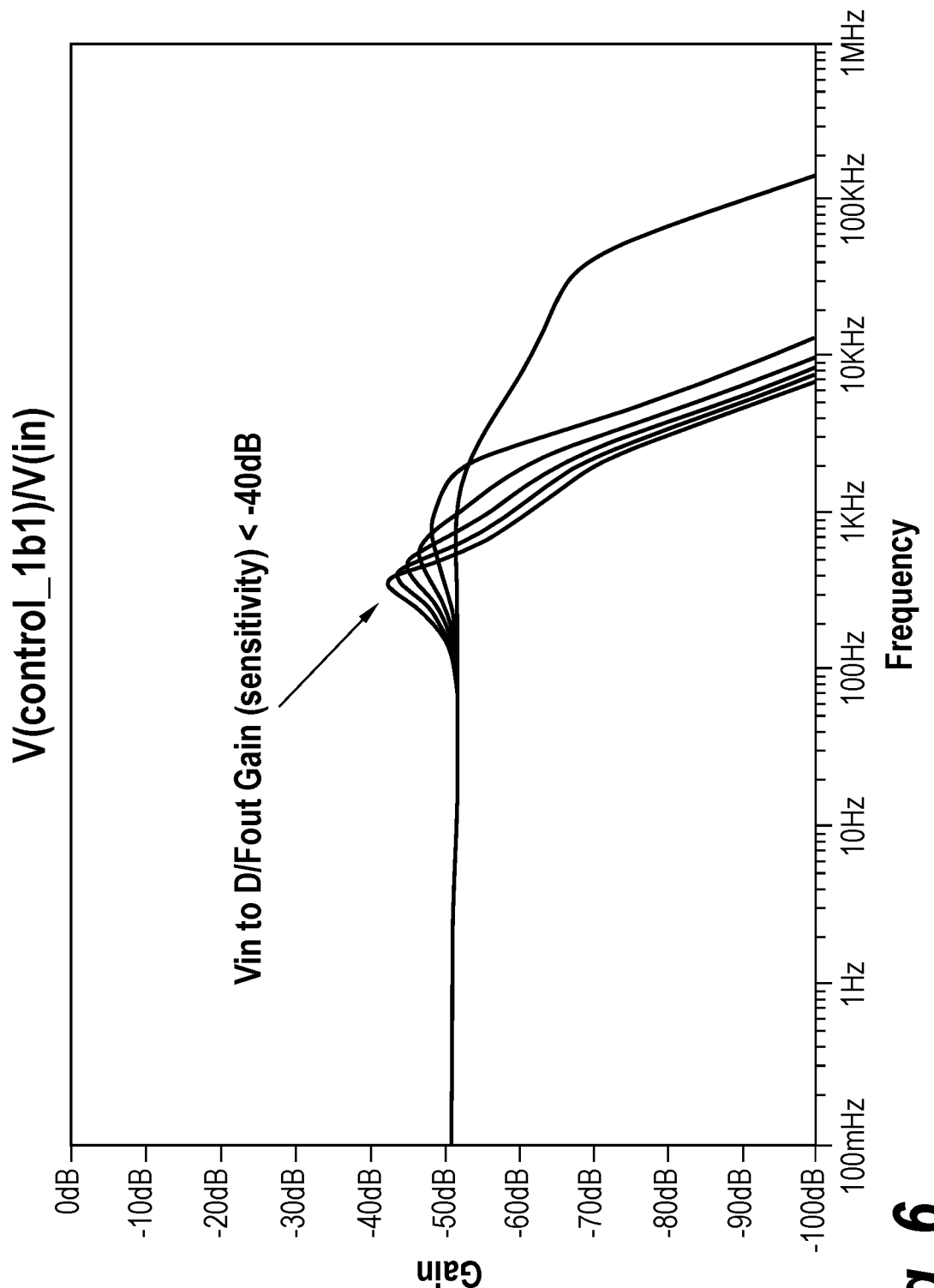
FIG. 6 includes a simulated transfer function plot illustrating operation of input voltage to duty cycle/frequency for the system of FIG. 3, according to some exemplary embodiments.

FIG. 6 includes a simulated transfer function plot illustrating sensitivity of input voltage Vin to duty cycle/frequency for the system of FIG. 3, according to some exemplary embodiments. Specifically, FIG. 6 is a plot of the duty cycle output signal D/Fout with respect to input voltage Vin. This plot illustrates the sensitivity of control signal 312 to input voltage over frequency. It shows that control signal 312 is relatively insensitive to disturbances at Vin across all frequencies, including the mid-band where the LC resonance occurs, as the gain is less than −40 dB at all frequencies. The different curves correspond to different values of added line inductance 104, which for purposes of the illustrated simulation was swept from 0.0 to 500 µH in 100 µH increments.

Figure 7:
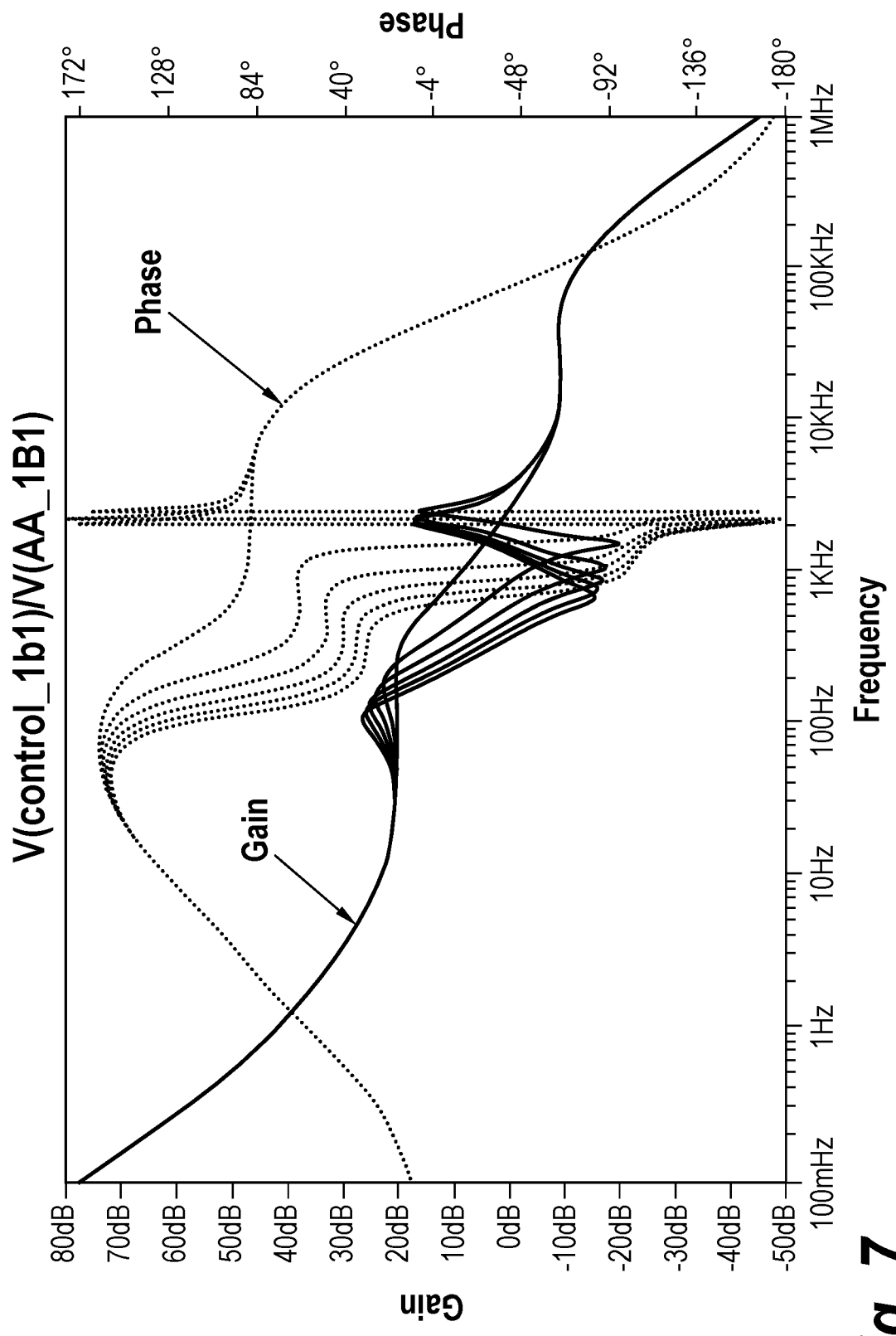
FIG. 7 includes a simulated controller loop gain Bode plot for the controller in the system of FIG. 3, according to some exemplary embodiments.

FIG. 7 includes a simulated controller loop gain Bode plot for the controller in the system of FIG. 3, according to some exemplary embodiments. These curves show the Bode plot (magnitude and phase) of the controller loop gain in FIG. 3. The loop gain is what would be measured from input to output if the loop could be broken between Vout and where Vout connects to controller 302 with a signal fed into the inverting (−) input of summing node 320 and the response measured at Vout. The different curves correspond to different values of added line inductance 104, which for purposes of the illustrated simulation was swept from 0.0 to 500 µH in 100 µH increments.

Figure 8:
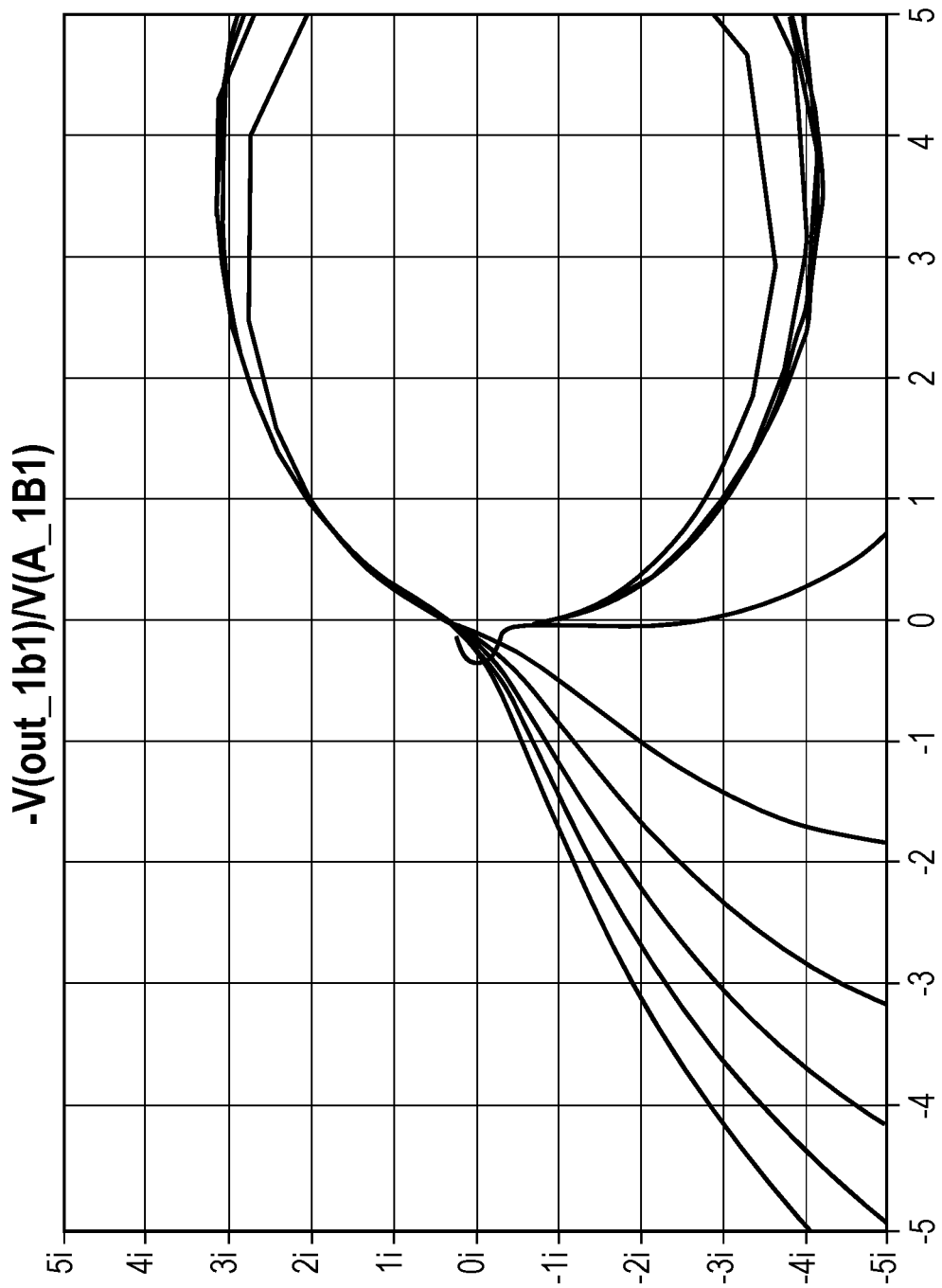
FIG. 8 includes a simulated controller loop gain Nyquist plot for the controller in the system of FIG. 3, according to some exemplary embodiments.

FIG. 8 includes a simulated controller loop gain Nyquist plot for the controller in the system of FIG. 3, according to some exemplary embodiments. The Nyquist plot shows the real (horizontal axis) versus imaginary (vertical axis) of 1+ loop gain. If these curves enclose the −1 point on the real axis, then the response is unstable. The Nyquist plot is an unambiguous and reliable mechanism by which stability of a feedback system can be shown.

Figure 9:
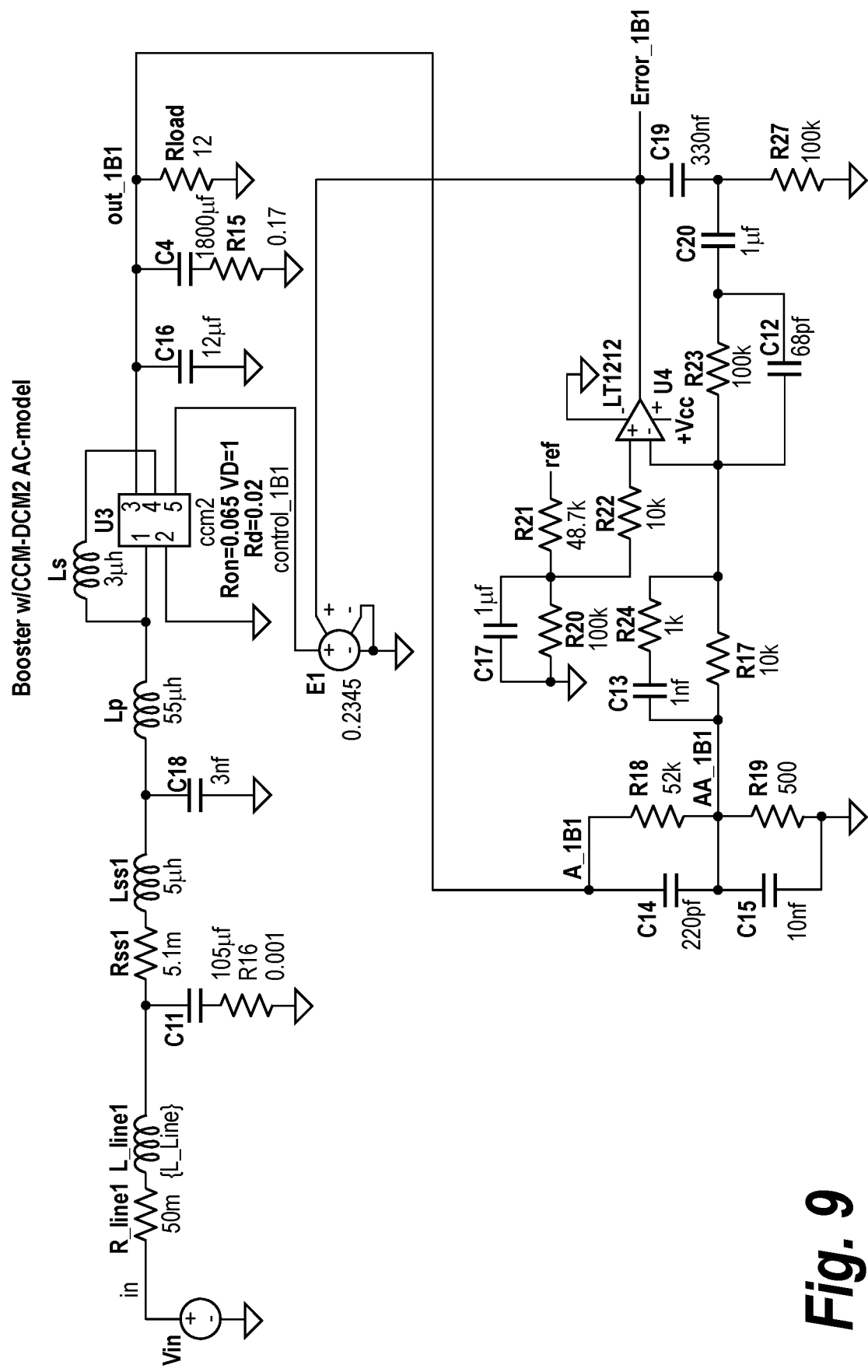
FIG. 9 includes a schematic diagram of the simulation model used for the implementation of the system of FIG. 3 to produce the simulated plots of FIGS. 5-8, according to some exemplary embodiments.

FIG. 9 includes a schematic diagram of a small signal simulation model used for the implementation of the system of FIG. 3 to produce the simulated plots of FIGS. 5-8, according to some exemplary embodiments. FIG. 9 illustrates the small signal continuous current mode model of the entire boost converter system implementation used for the design and simulation of the converter system.

Figure 10:
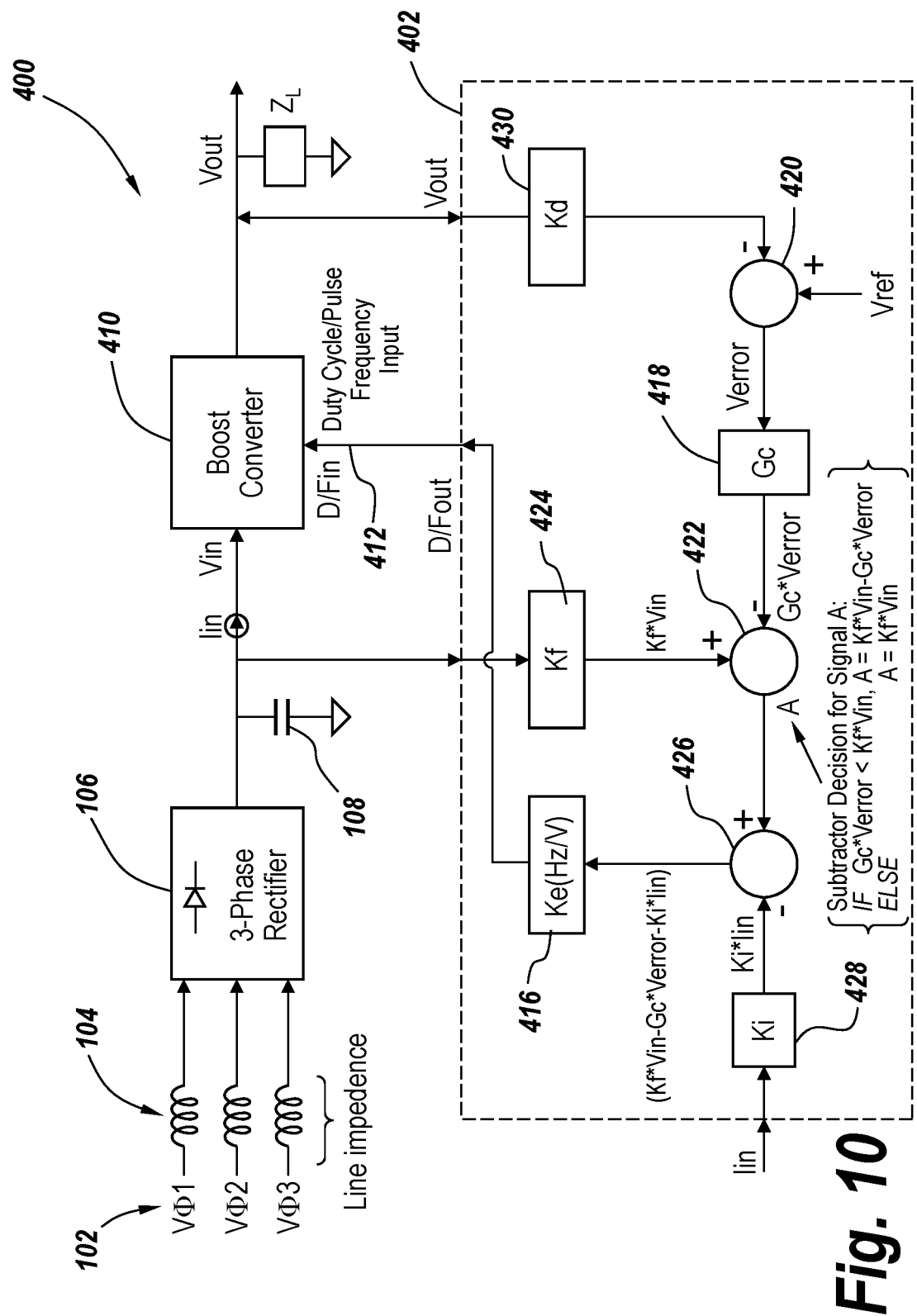
FIG. 10 includes a schematic functional block diagram of a power converter system which uses an active feedback loop controller to mitigate instability, according to some exemplary embodiments.

FIG. 10 includes a schematic functional block diagram of a power converter system 400 which uses an active feedback loop controller 402 to mitigate instability, according to some exemplary embodiments. Referring to FIG. 10, system 400 receives 3-phase line power 102. Each line of the input power 102 is characterized by a line impedance 104. The input AC power 102 is rectified by 3-phase rectifier 106 and filtered by input filter capacitance 108. The rectified and filtered input power is applied to boost converter circuity 410, which generates and outputs direct current (DC) power output Vout, which is illustrated in the exemplary embodiment to be applied to a load labeled $Z_L$, which can be inverter circuit 112, transformer 114 and plasma 116 described and illustrated above.

Controller 402 includes a summing node 420, which sums the loop output voltage signal Vout, scaled by a scale factor Kd 430, at its inverting input with a reference voltage Vref at its noninverting input to generate an error signal Verror. The error signal Verror is applied to an error amplifier/compensator Gc 418 which amplifies the error signal Verror to generate the output signal Gc*Verror. The amplified error signal Gc*Verror is applied to the inverting input of another summing node or subtractor 422. The signal out of rectifier 106 is sensed, and the sensed voltage Vin is applied to a scale factor generator 424, which applies the scale factor Kf to Vin to generate the signal Kf*Vin, which is applied to the noninverting input of summing node or subtractor 422. A signal identified by "A" is generated by summing node or subtractor 422 as follows:

If $Gc*Verror<Kf*Vin$, then $A=Kf*Vin-Gc*Verror$

Else, $A=Kf*Vin$.

The signal A is applied to the noninverting input of another summing node or subtractor 426.

The input current to boost converter 419 is sensed, and the sensed current Iin is applied to a scale factor generator 428, which applies the scale factor Ki to Iin to generate the signal Ki*Iin, which is applied to the inverting input of summing node or subtractor 426. The output of summing node or subtractor 426, given as A−Ki*Iin, is applied to a scale factor generator 416, which generates a control signal which identifies a translation between error voltage and switching frequency of boost converter 410. The scale factor Ke can be generated in Hertz/Volt. This scale factor D/Fout is output by controller 402 and applied as signal D/Fin at the Duty Cycle/Pulse Frequency input of boost converter 410 to control the frequency/duty cycle of the switching signal in boost converter 410 based on the amplified error signal Gc*Verror.

According to the present disclosure, feedback loop compensator Gc 418 is designed to make the system stable without the addition of RC damping circuitry. The frequency response of error amplifier/compensator Gc 418 results in a frequency-dependent impedance transformation looking into boost converter 410 from the power source. Selection of this frequency-dependent impedance transformation results in elimination of instability over the frequency range of interest. That is, by selection of the frequency response of error amplifier/compensator Gc 418, frequency shaping of the loop gain is achieved such that instability is eliminated over the desired frequency range. In effect, the loop gain is used to damp out the resonance to eliminate instability. Furthermore, system 400 also provides power factor correction using the additional feedback loop, which is formed of scale factor generator 424, summing node or subtractor 422, summing node or subtractor 426, and scale factor generator 428. This section of controller 402 compares the input current to signal A to generate the error signal for the duty cycle/frequency output to boost converter 410. Signal A is used as a reference signal to which the input current is compared. The magnitude of reference signal A is controlled by the voltage error Gc*Verror and the scaled input voltage to the converter Kf*Vin. The result of this is a form of power factor correction where the input current is modulated by the D/Fout signal 412 controlling boost converter 410 in order to follow the input voltage waveform. No multiplication blocks are used in this power factor corrector, which allows simpler implementation over prior art.

Figure 11:
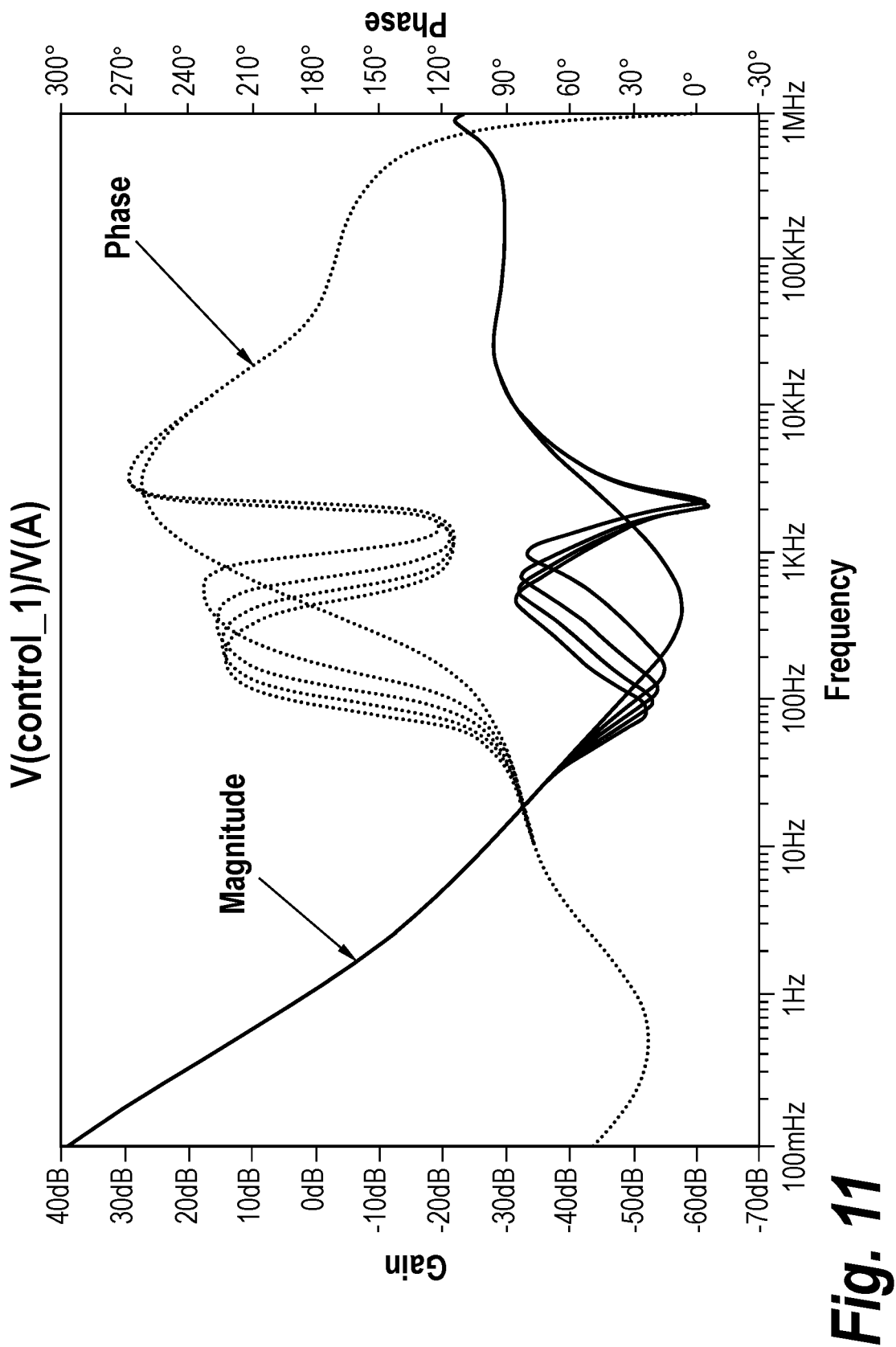
FIG. 11 includes a simulated transfer function plot illustrating operation of voltage feedback error to duty cycle/frequency for the system of FIG. 10, according to some exemplary embodiments.

FIG. 11 includes a simulated transfer function (Bode) plot illustrating operation of voltage feedback error to duty cycle/frequency for the system of FIG. 10, according to some exemplary embodiments. Specifically FIG. 11 is a plot of the duty cycle output signal D/Fout with respect to voltage error amplifier input Vout. The plot shows how the duty cycle/frequency control signal responds in the frequency domain. For example, as illustrated, at low frequencies, the gain is high. At mid-band frequencies where the LC resonance due to line inductance 104 and input capacitance 108 occurs, the gain is low. The gain-versus-frequency response of this transfer function show the sensitivity of voltage feedback error Verror driving control signal 412 over frequency. The different curves correspond to different values of added line inductance 104, which for purposes of the illustrated simulation was swept from 0.0 to 500 µH in 100H increments.

Figure 12:
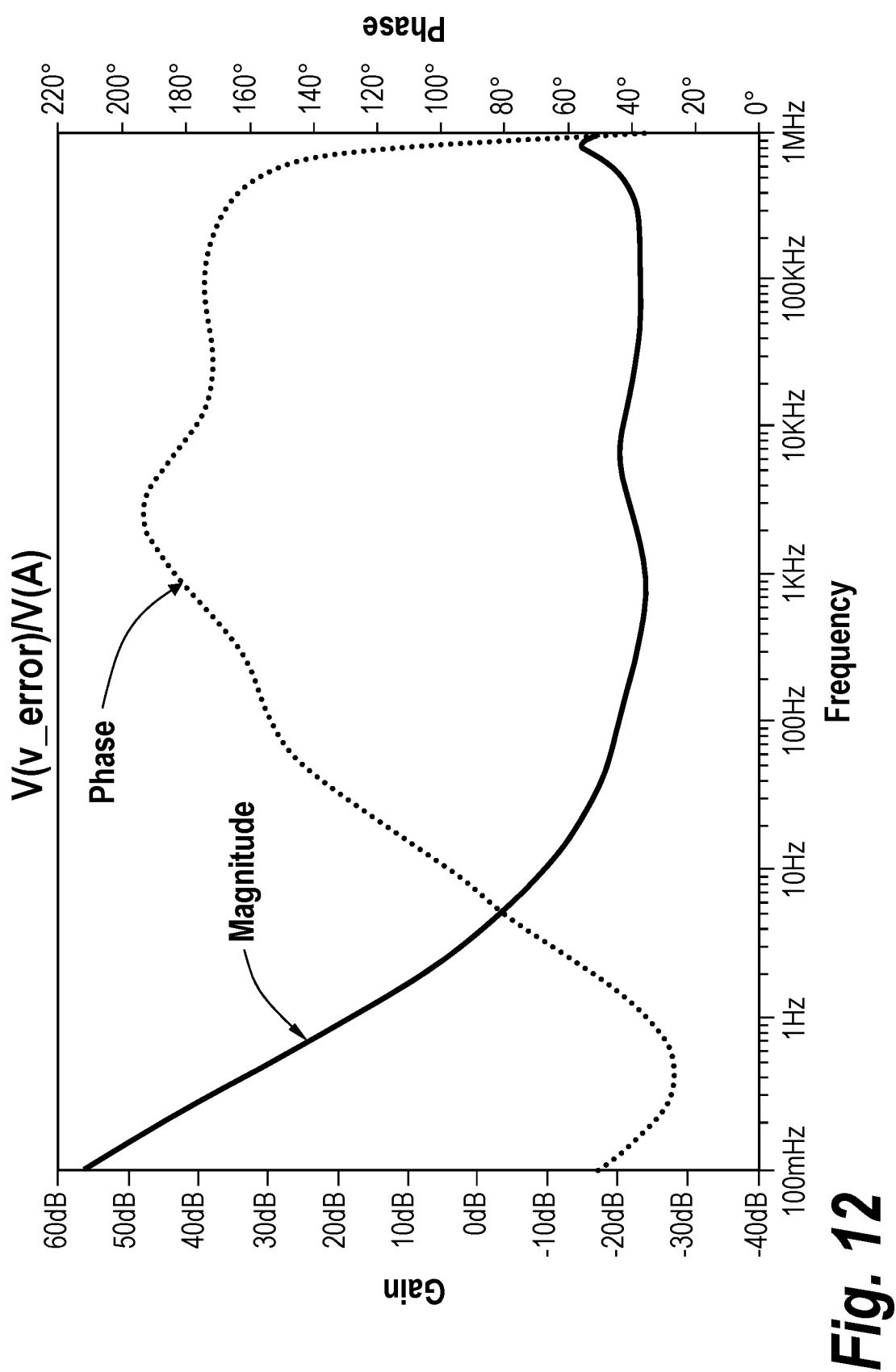
FIG. 12 includes a simulated transfer function plot illustrating operation of error amplifier/compensator Gc for the system of FIG. 10, according to some exemplary embodiments.

FIG. 12 includes a simulated transfer function plot illustrating operation of error amplifier/compensator Gc 418 for the system of FIG. 10, according to some exemplary embodiments. Specifically FIG. 12 is a plot of the voltage error amplifier output signal Gc*Verror with respect to voltage error amplifier input Vout. The plot shows the Gc controller gain versus frequency. The plot illustrates that the gain is highest at low frequencies and is shaped to minimize the sensitivity in the mid-band frequencies in the range of 100 Hz to 2 kH, where the input LC resonance occurs. The different curves correspond to different values of added line inductance 104, which for purposes of the illustrated simulation was swept from 0.0 to 500 µH in 100 µH increments. The compensator gain 418 is insensitive to input voltage variations at Vin, so the Gc curve is constant with changes in line inductance 104.

Figure 13:
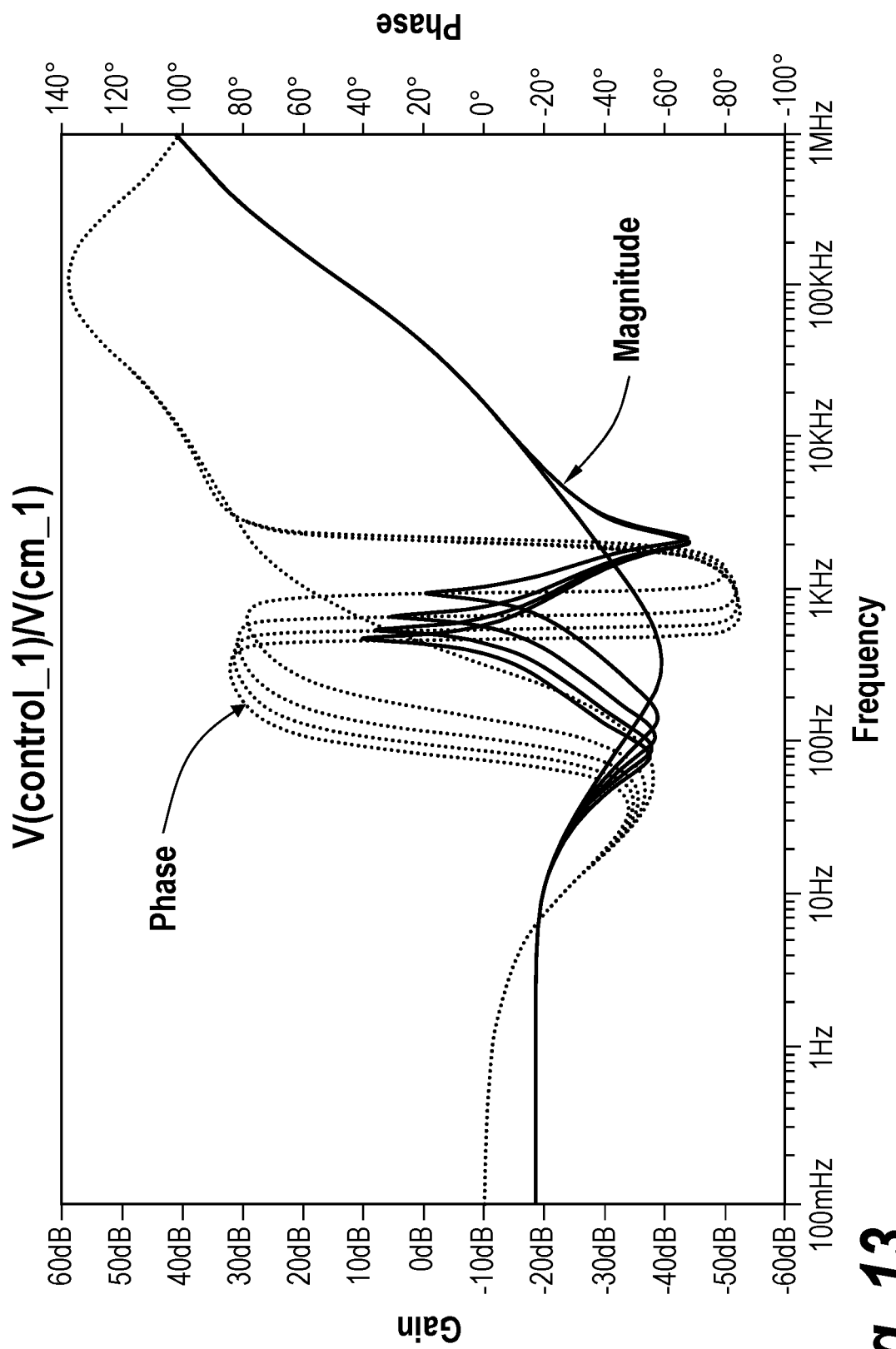
FIG. 13 includes a simulated transfer function plot illustrating operation of input current to duty cycle/frequency for the system of FIG. 10, according to some exemplary embodiments.

FIG. 13 includes a simulated transfer function plot illustrating operation of input current to duty cycle/frequency for the system of FIG. 10, according to some exemplary embodiments. Specifically FIG. 13 is a plot of the duty cycle output signal D/Fout with respect to input current Iin. This plot illustrates the sensitivity of control signal 412 to input current over frequency. It shows that control signal 412 will respond with higher sensitivity to disturbances in the input current at the mid-band frequencies where the LC resonance occurs. Changes in input current due to the LC resonances are acted upon by the feedback loop with higher gain, relative to input voltage Vin, which results in the loop desensitizing itself from the effects of these resonances by effectively increasing the input impedance of boost converter 410 at these frequencies. The different curves correspond to different values of added line inductance 104, which for purposes of the illustrated simulation was swept from 0.0 to 500 µH in 100 µH increments.

Figure 14:
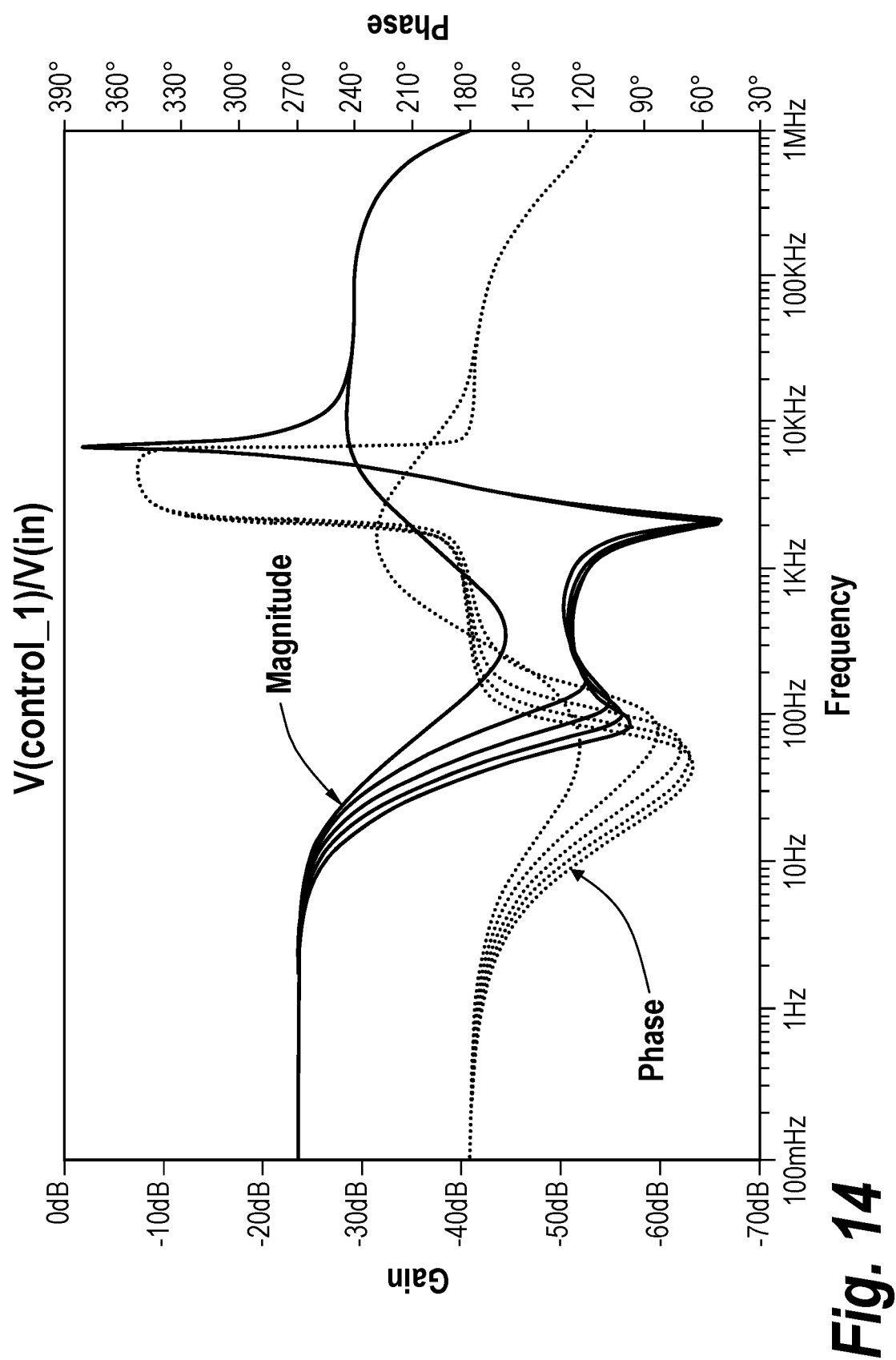
FIG. 14 includes a simulated transfer function plot illustrating operation of input voltage to duty cycle/frequency for the system of FIG. 10, according to some exemplary embodiments.

FIG. 14 includes a simulated transfer function plot illustrating operation of input voltage to duty cycle/frequency for the system of FIG. 10, according to some exemplary embodiments. Specifically FIG. 14 is a plot of the duty cycle output signal D/Fout with respect to input voltage Vin. This plot illustrates the sensitivity of control signal 412 to input voltage over frequency. It shows that control signal 412 will not respond to a disturbance at Vin with as much gain in the mid-band frequencies where the LC resonance occurs. The different curves correspond to different values of added line inductance 104, which for purposes of the illustrated simulation was swept from 0.0 to 500 µH in 100 µH increments.

Figure 15:
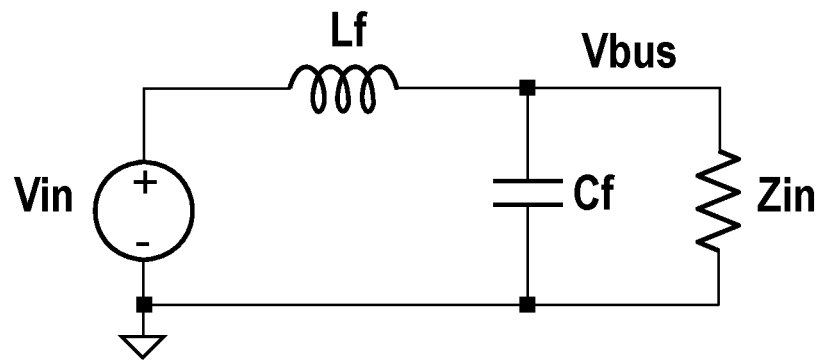
FIG. 15 includes a simplified equivalent circuit model for an input filter and boost converter with constant-power load.

FIG. 15 includes a simplified equivalent circuit model for an input filter and boost converter with constant-power load. Referring to FIG. 15, Zin represents the converter input impedance for a constant power load. At frequencies lower than the converter feedback loop gain 0 dB crossover point, Zin is a negative resistance and is inversely proportional to the output load power:

$$Zin = -\frac{Vbus^2}{Pout},$$

at frequencies below unity gain of feedback loop; where Zin is input Impedance, Vbus is output DC voltage of the converter, and Pout is output power of the converter.
The Laplace transfer function of this system is:

$$T(s) = \frac{Vbus}{Vin} = \frac{1}{S^2(L_f C_f) + S\left(\frac{L_f}{Z_{in}}\right) + 1};$$

where T(s) is the Laplace transform of Vbus/Vin, S is the Laplace operator, Lf is inductance of the LC input filter, Cf is capacitance of the LC input filter, and Zin is input impedance of the power converter.
Substituting the parameters into standard $2^{nd}$ order form:

$$T(s) = \frac{1}{\frac{S^2}{\omega_n^2} + 2\zeta\frac{S}{\omega_n} + 1}$$

Where:

$$\omega_n = \frac{1}{\sqrt{L_f C_f}},$$

$$\zeta = \frac{L_f \omega_n}{2Z_{in}},$$

where $\zeta$ is the damping factor and Wn is the undamped resonant frequency.
It can be seen that the damping factor $\zeta$ is a function of the converter input impedance Zin.
To determine the time domain response of this system, the inverse Laplace transform is applied to this transfer function when excited by a unit step function $$\left(\frac{1}{S}\right):$$

$$\left(\frac{1}{S}\right) * T(s) = \left(\frac{1}{S}\right) * \frac{1}{\frac{S^2}{\omega_n^2} + 2\zeta\frac{S}{\omega_n} + 1}$$

Figure 16:
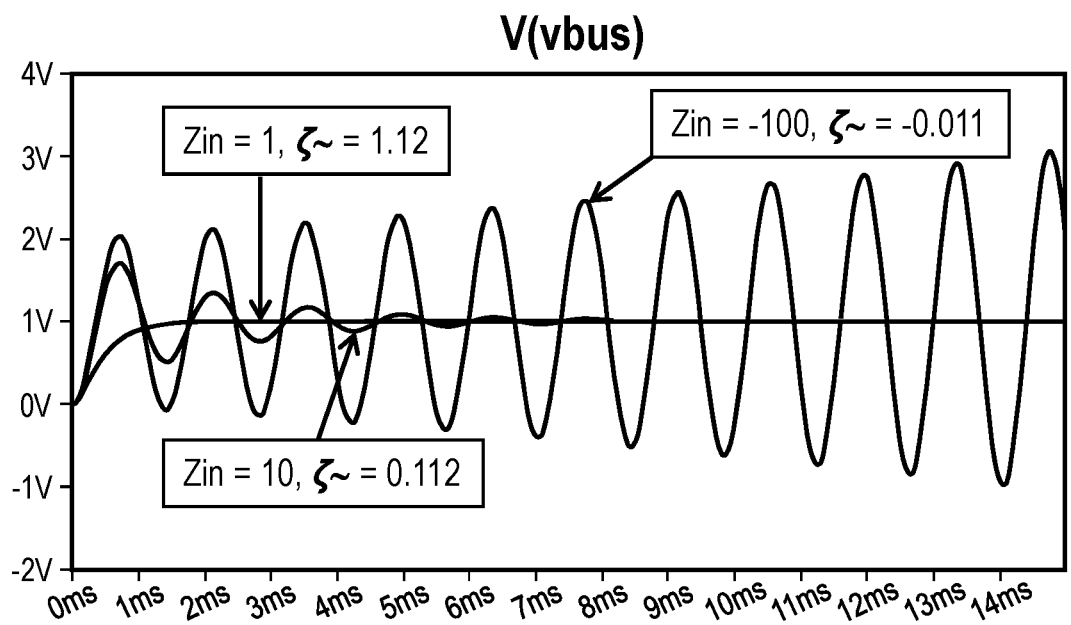
FIG. 16 is a plot of Vbus time domain response of the circuit model illustrated in FIG. 15.

Time Domain Response: $Y(t) = 1 - \frac{e^{-\zeta\omega_n t}}{\sqrt{1-\zeta^2}}\sin(\omega_d t + \theta)$ for $\zeta < 1$, $\omega_d = \omega_n\sqrt{1-\zeta^2}$ $\theta = \cos^{-1}(\zeta)$ Damping coefficient $\zeta$ cases to consider:
For $\zeta<0$, a positive exponential results and the system step response is unbounded
For $\zeta=0$, two imaginary poles at $+/-j\omega_n$, system oscillates continuously
For $\zeta>0$, a negative exponential results and the system time domain response is bounded. It is this case that we want to create by altering Zin to affect the damping factor $\zeta$.
For $\zeta>1$ the system is "over-damped"
For $\zeta=1$ the system is "critically damped"
For $0<\zeta<1$ the system exhibits a decaying oscillatory response This is illustrated in FIG. 16, which is a plot of Vbus time domain response of the circuit model illustrated in FIG. 15, including curves for Zin=10 (over-damped), Zin=1 (critically damped) and Zin=-100 (under-damped, decaying oscillatory response). In the exemplary illustration of FIG. 16, Vin=1 V step, with Lf=500 µH, Cf=100 µF.
Therefore, it is seen from $$\zeta = \frac{L_f \omega_n}{2Z_{in}}$$

that if Zin<0, the system response will be unbounded with a diverging transient response. In order to have a stable system where there is no control over the input filter network components and external physical damping network components cannot be used, the only control available is Zin of the converter. Therefore, according to the exemplary embodiments, Zin is altered at the frequency of interest w (the resonant frequencies of the input filter network) such that the system is stable with a bounded time domain response.

Figure 17:
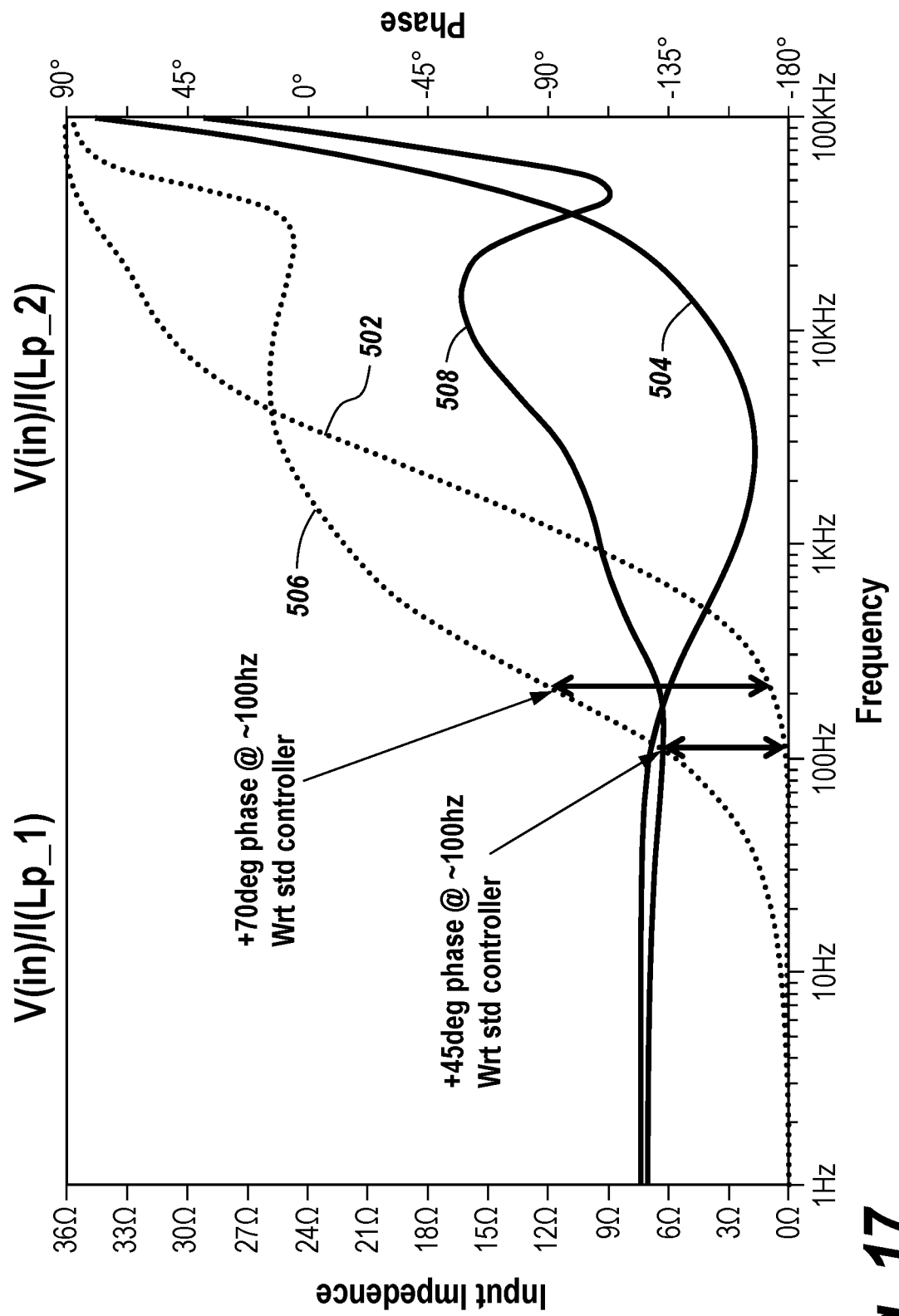
FIG. 17 includes a plot of input impedance over frequency of the boost converter with the controller illustrated in FIG. 10, according to some exemplary embodiments.

FIG. 17 includes a plot of input impedance Zin over frequency for a conventional feedback controller and for the feedback controller 402 of FIG. 10, according to some exemplary embodiments. Referring to FIG. 17 curves 502 (phase) and 504 (magnitude) illustrate the case for the standard controller, and curves 506 (phase) and 508 (magnitude) illustrate the case for controller 402 of FIG. 10. It is noted that there is shown a +45 degree phase difference of controller 402 with respect to the standard controller at approximately 100 Hz and a +70 degree phase difference of controller 402 with respect to the standard controller at approximately 100 Hz. Curve 508 is the magnitude of input impedance of controller 402 versus frequency, and curve 506 illustrates the phase of the input impedance of controller 402 versus frequency. Curve 504 illustrates magnitude of the input impedance of a standard controller versus frequency, and curve 502 is the phase of the input impedance of a standard controller versus frequency. It is evident from FIG. 17 that the input impedance of controller 402 exhibits a leading phase compared to the standard controller. The phase 506 of controller 402 at about 200 Hz is −90 degrees, where the phase of the standard controller is about −180 degrees. Controller 402 does not have negative impedance at about 200 Hz, where the standard controller input impedance is negative at about 200 Hz. The result of this is that controller 402 input impedance will act to damp out an input filter resonance, and the standard controller will not.

Figure 18:
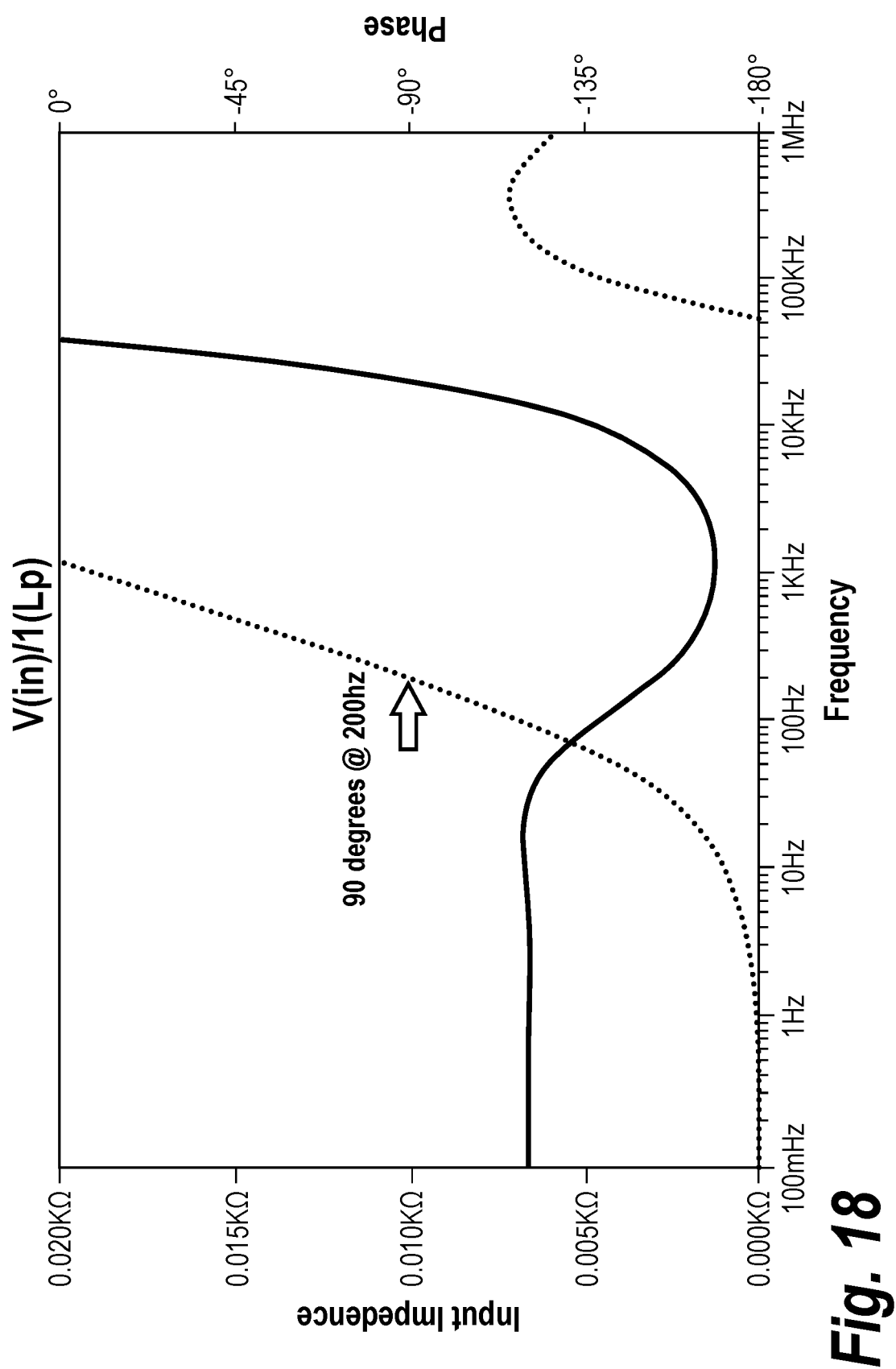
FIG. 18 includes a plot of input impedance over frequency of the boost converter with the controller illustrated in FIG. 3, according to some exemplary embodiments.

Similarly, FIG. 18 includes a plot of input impedance over frequency of the boost converter with controller 302 illustrated in FIG. 3, according to some exemplary embodiments. FIG. 18 illustrates that controller 302 of FIG. 3 makes the boost converter input impedance look positive above approximately 200 Hz. Referring to FIG. 18, it is noted that there is negative input impedance at 10 Hz and below. Phase=−180 degrees at low frequencies but begins to lead above approximately 10 Hz. At 200 Hz, the phase is leading by 90 degrees, as indicated on the plot of FIG. 18.

FIGS. 17 and 18 illustrate that all of the controller input impedances are negative at low frequencies. The standard controller has negative input impedance out to greater than 100 Hz. It is noted that controllers 302 and 402 are considered in the absence of any Vin damping circuit. FIGS. 17 and 18 illustrate that, according to the present disclosure, the input impedance of boost converters 310 and 410 are modified by controllers 302 and 402, respectively, such that controllers 302 and 402 act as damping resistors for an input LC resonance.

In the foregoing detailed description, the block diagrams for controllers 302 and 402 in FIGS. 3 and 10, respectively, are sufficient to describe hardware implementations of exemplary embodiments to enable one of skill in the art to make and use the innovations of the present disclosure. Also, the 318 and 418 Gc block transfer function of gain-versus-frequency response curves for Gc blocks 318 and 418 are sufficient to describe how the frequency response is implemented to achieve system stability. An exemplary analog circuit implementation is also provided in FIG. 9 for controller 302 of FIG. 3 as well as details of 318 Gc block 318 of controller 302. It should be noted that these systems can alternatively be implemented digitally in a digital signal processor (DSP). In these DSP-based systems, the block diagrams and frequency response plots provided herein are the most useful describing elements.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A power conversion system, comprising:
an input for receiving three-phase alternating current (AC) power signals on input power lines, each of the input power lines being characterized by a line impedance;
a three-phase rectifier for rectifying the input power signals to generate rectified signals;
a filter circuit for filtering the rectified signals to generate filtered signals;
a boost converter for receiving the filtered signals at a signal input of the boost converter, the boost converter converting the filtered signals to a higher-voltage signal and outputting the higher-voltage signal at an output of the boost converter;
a feedback control loop comprising a feedback controller circuit connected between the output of the boost converter and a duty cycle control input of the boost converter, the control input of the boost converter controlling duty cycle and pulse frequency of the boost converter; wherein the feedback controller circuit comprises:
a first summing node which generates an error signal indicative of a difference between a scaled voltage of the output signal of the boost converter and a reference voltage, and
a compensator circuit receiving the error signal and applying a gain to the error signal to generate an amplified error signal, wherein the gain of the compensator circuit is dependent on the frequency of the boost converter such that the feedback controller circuit provides a frequency-dependent impedance transformation looking into the boost converter from the source such that instability due to the line impedance is reduced;
a feedforward control loop connected between the signal input of the boost converter and the duty cycle control input of the boost converter, the feedforward control loop being used to control power factor correction with respect to the three-phase alternating current (AC) power signals received on the input power lines, wherein the feedforward control loop comprises: a first scaling circuit for applying a scale factor to a sensed voltage of the filtered signals at the signal input of the boost converter to generate a scaled sensed voltage signal; and a second scaling circuit for applying a second scale factor to a sensed current of the filtered signals at the signal input of the boost converter to generate a first scaled sensed current signal;
a second summing node receiving the scaled sensed voltage signal and the amplified error signal and generating a first difference signal indicative of a difference between the scaled sensed voltage signal and the amplified error signal; and a third summing node receiving the first difference signal and the first scaled sensed current signal and generating a second difference signal indicative of a difference between the first difference signal and the first scaled sensed current signal.

2. The power conversion system of claim 1, further comprising an inverter receiving the output signal from the boost converter and converting the output signal from the boost converter to a second AC signal.

3. The power conversion system of claim 2, further comprising a transformer receiving the second AC signal at a primary winding of the transformer.

4. The power conversion system of claim 3, wherein a secondary winding of the transformer is connected to a load.

5. The power conversion system of claim 4, wherein the load is a plasma.

6. The power conversion system of claim 1, further comprising a third scaling circuit for applying a scale factor to the second difference signal to generate a scaled second difference signal, the scaled second difference signal being applied to the duty cycle control input of the boost converter to alter the duty cycle and/or pulse frequency of the boost converter.

* * * * *